United States Patent [11] 3,617,211

[72] Inventor Ross R. Dawson
Buffalo, N.Y.
[21] Appl. No. 840,019
[22] Filed July 8, 1969
[45] Patented Nov. 2, 1971
[73] Assignee Allied Chemical Corporation
New York, N.Y.

[54] PHENYL GLYCOL AND SHORT-CHAIN HALOGENATED HYDROCARBON DYE COMPOSITION
22 Claims, No Drawings
[52] U.S. Cl. .................................................... 8/173,
8/93, 8/94, 8/175
[51] Int. Cl. ...................................................... D06p 5/04
[50] Field of Search ........................................... 8/93, 173, 174

[56] References Cited
UNITED STATES PATENTS
| | | | |
|---|---|---|---|
| 2,828,180 | 3/1958 | Sertorio ........................ | 8/62 |
| 3,083,069 | 3/1963 | Hirsbrunner ................. | 8/54 |
| 3,129,053 | 4/1964 | Castle ........................... | 8/173 |
| 3,236,582 | 2/1966 | Veda ............................. | 8/4 |
| 3,402,986 | 9/1968 | Zviak ............................ | 8/10 |
| 3,385,652 | 5/1968 | Walter .......................... | 8/173 |
| 3,510,243 | 5/1970 | Seuret .......................... | 8/172 X |

FOREIGN PATENTS
1,071,074   7/1967   Great Britain ................

OTHER REFERENCES
Schmidlin, Preparation and Dyeing of Synthetic Fibres, pages 152– 159, pub. by Chapman & Hall Ltd. London, Eng. TS./548.5-S34 & Gp167
White, American Dyestuff Reporter, July 31, 1967, pages 18– 25 TP890A512 & 8/94

*Primary Examiner*—Donald Levy
*Attorney*—Jay P. Friedenson

ABSTRACT: Dyes are dispersed or dissolved in a volatile liquid halogenated short-chain aliphatic hydrocarbon and phenoxy, short-chain alkylphenoxy- or halophenoxy-glycol or -diglycol to make an organic solvent dyeing bath or stock dye solution.

PHENYL GLYCOL AND SHORT-CHAIN HALOGENATED HYDROCARBON DYE COMPOSITION

The textile industry has for years been plagued by major time-consuming steps in dyeing processes. One of the major time-consuming steps has been the long cycle time for the dye to be absorbed into the fiber. Another time-consuming step has been long drying periods necessary to remove the dye carrier, normally water. THe present invention provides compositions for rapid dyeing of textiles and short drying periods, thereby reducing the overall cost of operations.

In accordance with the present invention, it has been found that fibrous materials, either naturally occurring or man made, are capable of being dyed by solvent dyeing procedures employing as the dyestuff component, a dyestuff composition comprising (1) a volatile inert, stable liquid organic compound boiling below about 160° C., and (2) an aryl glycol ether corresponding to the general formula $$Ar(OCH_2CHR)_n-OH$$

wherein R is a member of the group consisting of hydrogen and methyl, n is an integer of from 1 to 2 and Ar is an aromatic hydrocarbon radical of the benzene series, or a halo- or lower alkyl-substituted derivative thereof. One such solvent dyeing procedure involves wetting, for example, padding, the fibrous material with a dye formulation dissolved or dispersed in a mixture of volatile organic solvents, heating the resultant mixture of volatile organic solvents, heating the resultant mixture of solvents, dyestuff and fibrous material, and removing the vaporized solvents from the dyed fibrous materials, while simultaneously fixing the dyestuff on the fibrous material by means of heat. Another such solvent dyeing procedure is effected by impregnating the fibrous material with the dyestuff composition, evaporating the solvent mixture and fixing the dyestuff onto the fiber by a suitable heat treatment.

Commercially acceptable dyed fabrics have been obtained when the dyestuff is dissolved or dispersed in a volatile organic solvent mixture having a boiling point above about 40° C. but below the softening point of the fibrous material. It is also known to be advantageous to employ as a part of the dye formulation a dyeing adjuvant of boiling point below 220° C. which may function as a fiber-swelling agent, such as an alkylene carbonate. THe preferred process of application of the dyestuff compositions of the present invention functions essentially by first padding or otherwise wetting the fibrous material with a controlled amount of dye formulation, and fixing the dyestuff on the fibrous material while the latter is maintained in a zone of vapors of the same or different solvent for from about 10 to about 180 seconds. The vapor zone can conveniently be established by various means, such as boiling solvent at the bottom of the zone, employing heated drums or "cans" within the vapor zone over which the fibrous material is passed, or the zone can be supplied with vapors, which may be superheated, from a source external of the zone. THe escape of vapors from the vapor zone may be prevented by providing a vapor-condensing means which establishes the upper limit of the vapors and removes vapor in excess of that required to fill said zone. THe condensed vapors may be reused in the dye formulations, or solvent vapor zones.

Substantially any fibrous material, commercially available, whether natural or manmade fibers or blends thereof, can be dyed with the dyestuff compositions of the present invention. Thus, the naturally occurring fibers such as wool and cotton, and the synthetic fibers, such as nylon, the polyesters, the acetates, rayon, the acrylics, polypropylenes and polyethylenes, can be dyed, as well as blends of these fibers with a wide range of conventional dyestuffs.

Exemplary of the dyes suitable for use in the compositions of the present invention are the disperse, cationic, acid, basic, direct dyes, as well as dyes in solvent soluble state, i.e., soluble in an organic solvent.

Representative disperse dyes, suitable for use in the compositions of the present invention are:
C.I. Disperse Yellow 1(C.I. 10345)
C.I. Disperse Yellow 3(C.I. 11855)
C.I. Basic Yellow 11(C.I. 48055)
C.I. Basic Orange 21(C.I. 48035)
C.I. DIsperse Orange 11(C.I. 60700)
C.I. Disperse Red 11(C.I. 62015)
C.I. Acid Red 114(C.I. 23635)
C.I. Disperse Red 1(C.I. 11110)
C.I. Disperse Red 13(C.I. 11115)
C.I. Disperse Red 35
C.I. Disperse Blue 7(C.I. 62500)
C.I. Acid Blue 25(C.I. 62055)
C.I. Disperse Blue 14(C.I. 61500)
C.I. Disperse Blue 27
C.I. Basic Green 4(C.I.42000)
C.I. Basic Violet 14(C.I.42510)
C.I. Disperse Yellow 37
C.I. Disperse Yellow 9(C.I. 10375)
C.I. Direct Yellow 12(C.I. 24895)
C.I. Acid Orange 86
C.I. DIrect Red 31(C.I.29100)
C.I. Acid Red 209
C.I. Disperse Red 19(C.I. 11130)
C.I. Basic Red 13(C.I. 48015)
C.I. Disperse Red 3
C.I. Disperse Blue 26(C.I.63305)
C.I. Acid Blue 40(C.I. 62125)
C.I. Basic Blue 21
C.I. Disperse Blue 19(C.I. 61110)
C.I. Direct Blue 55(C.I. 27940)
C.I. Direct Green 12(C.I. 30290)
Representative acid dyes are:
C.I. Acid Blue 40(C.I. 62125)
C.I. Acid Blue 25(C.I. 62055)
C.I. Acid Red 209
C.I. Acid Red 114(C.I. 23635)
(C.I. Acid Blue 113(C.I. 26360)
C.I. Acid Blue 102(C.I. 50320)
C.I. Acid Red 39
C.I. Acid Orange 56(C.I. 22885)
C.I. Acid Orange 3 (C.I. 10385)
C.I. Acid Yellow 1 (C.I. 10316)
C.I. Acid Yellow 29(C.I.18900)
Representative basic dyes are:
C.I. Basic Blue 21
C.I. Basic Blue 22
C.I. Basic Blue 9(C.I. 52015)
C.I. Basic Blue 26(C.I. 44045)
C.I. Basic Blue 1(C.I. 42025)
C.I. Basic Green 4(C.I. 42000)
C.I. Basic Orange 21(C.I. 48035)
C.I. Basic Orange 22(C.I. 48040)
C.I. Basic Red 13(C.I. 48015)
C.I. Basic Red 14
C.I. Basic Violet 7(C.I. 48020)
C.I. Basic Red 1(C.I. 45160)
C.I. Basic Yellow 11(C.I. 48055)
C.I. Basic Yellow 13
Representative direct dyes are:
C.I. Direct Red 31(C.I. 29100)
C.I. Direct Yellow 12(C.I. 24895)
C.I. Direct Green 12(C.I. 30290)
C.I. Direct Blue 55(C.I. 27940)
C.I. Direct Red 81(C.I. 28160)
C.I. Direct Blue 67(C.I. 27925)

As is well known in this art, organic dyestuffs in solvent soluble state, such as solvent dyes, for example, amine salts of acid and/or direct dyestuffs, are highly soluble in a variety of organic solvents. Accordingly, such organic salts, for example as formed by reaction of an acid or direct dye containing at least one sulfonic acid group or alkali metal salt thereof with an organic base, such as amine, constitute a preferred class of dyestuffs for the compositions of the present invention. Concentrated Solutions of such dyestuffs may be prepared from dyestuff compositions of commerce by the following general procedure:

An amount of an acid or direct dye, e.g. one normally available as the alkali metal salt of a sulfonic acid, is slurried in a convenient of water at 80° to 90° C. To the slurry, an amount of acid, e.g. acetic acid or hydrochloric acid, is added to render the slurry acid, e.g. pH of about 2 to 4. An approximately equivalent amount of an organic base, e.g. dioctylamine, is then added, forming the organic amine salt of the dyestuff which salt is insoluble in water, and separates from the aqueous mother liquor as an oily phase. The aqueous portion, containing dissolved therein inorganic salts, is removed and the oil layer is dissolved in an organic solvent, e.g. perchloroethlylene. This solution may be washed with 1 percent aqueous acetic acid to remove salts occluded in oil layer. THe solvent solution of the dyestuff is dried by azeotropic distillation and the dye solution filtered to remove insolubles. The solution can be adjusted to the desired dyestuff concentration by addition of solvent, e.g. trichloroethane or perchloroethylene, or cosolvent, e.g. $\beta$-phenoxyethanol.

In an analogous manner organic solvent solution of cationic dyestuffs, which are usually marketed as mineral acid salts, can be prepared by slurrying the dye in water and basifying the slurry with an alkali, e.g. soda ash. The free basic dyestuff is then converted to an organic solvent soluble form by addition of an organic acid, e.g. propionic acid. Thereafter, the addition of organic solvent, e.g. trichloroethane, permits the separation of water and dyestuff solution which can be treated as described above.

THe aforementioned dyestuffs are illustrative of the many and varied types of colorants which can be employed in the formulations of the present invention. It is pointed out, however, that the particular textile(s) being dyed determines the class of dyestuff used and that it is not suggested or inferred that any dyestuff may be used to color any textile.

The organic dyestuffs, as above enumerated, are employed in conjunction with an organic solvent system which is the vehicle for transferring the dyestuff to the textile fiber. This organic solvent system is readily volatile, i.e., has an appreciable vapor pressure at the temperature of the fixation step of the dyeing process and which, in the vapor state, can serve as a heat transfer medium. Desirably, the dyestuff should be appreciably soluble in the organic solvent system, but in many instances, dyestuffs of limited solubility can be used with acceptable to excellent results. The organic solvent system employed herein consists essentially of an organic solvent mixture comprising (1) a volatile inert sable liquid organic compound boiling below about 160° C., and (2) an aryl glycol ether corresponding to the general formula $$Ar(OCH_2CHR)_n-OH$$

wherein R is a member of the group consisting of hydrogen and methyl, n is an integer of from one to two and Ar is an aromatic hydrocarbon radical of the benzene series, or a halo- or lower alkyl-substituted derivative thereof.

The liquid organic compound employed as component of the organic solvent mixture used in the dyestuff compositions of the present invention may be any one or mixture of a large group of stable liquid compounds which are inert to the organic dyestuff and substrate being dyed. It is essential in accordance with the present invention that this organic liquid component vaporize below the softening temperature of the fiber being dyed and at a temperature at which it can be efficaciously removed, i.e. below about 160° C. Illustrative liquid organic compounds employable are the aliphatic hydrocarbons such as n-hexane, n-heptane and isooctane; aromatic hydrocarbons such as benzene, toluene and xylene; chlorinated, brominated, fluorinated and mixed halogenated lower aliphatic hydrocarbons having from one to four carbon atoms, such as methylene chloride, chloroform, dichloromonofluoroethane, 1,1,1-trifluoropropane, bromodichlorobutane, 1,1,1-trichloroethane, carbon tetrachloride, tetrachloroethylene (perchloroethylene) and trichloroethylene; lower alkanols such as methanol, ethanol, isopropanol and tertiary butanol; heterocyclic compounds such as pyridines and picolines; glycol ethers such as methyl cellosolve and the like. The preferred class of liquid organic compound solvents are the halogenated hydrocarbons containing from one to four carbon atoms, from two to four halogen atoms thereof having an atomic number from about nine to 35 and especially the chlorinated and fluorinated saturated aliphatic and olefinic hydrocarbons containing from one to four carbon atoms. The liquid organic compound is employed in quantities sufficient to dissolve, disperse or suspend the organic dyestuff, generally at least about 10 and up to about 99 parts, by weight, per part of dyestuff being adequate. Preferably, the liquid organic compound is is employed in an amount from about 50 to 99 parts, by weight, based on the total weight of the dyestuff composition.

The aryl glycol ether employed as component in the organic solvent mixture of the dyestuff compositions of the present invention, hereinafter referred to as cosolvent, is one or a mixture of polar compounds which function principally to solubilize the dyestuff and, to a lesser extent to "swell" the textile fiber. THe aryl glycol ethers contemplated correspond to the general formula $$Ar(OCH_2CHR)_n-OH$$

wherein R is a member of the group consisting of hydrogen and methyl, n is an integer of from one to two and Ar is an aromatic hydrocarbon radical of the benzene series which may contain further substituents, such as halogen (e.g. fluoro, chloro and bromo) and lower alkyl containing one to six carbon atoms (e.g. methyl, ethyl, propyl, butyl, amyl and hexyl). Example of such aryl glycol ethers which may function as cosolvents in the compositions of this invention include:

$\beta$-phenoxyethanol
1-phenoxy-propanol-2
mono-4-chlorophenylether of ethylene glycol
mono-2,4-dichlorophenyl ether of ethylene glycol
mono-4-fluorophenyl ether of ethylene glycol
mono-2-bromophenyl ether of ethylene glycol
mono-p-tolyl ether of ethylene glycol
mono-4-chlorophenyl ether of 1,2-propylene glycol
monophenylether of bis-1,2-propylene glycol
mono-o-tolyl ether of 1,2-propylene glycol
monophenyl ether diethylene glycol
mono-2,4-dichlorophenyl ether of diethylene glycol
mono-p-tolyl ether of diethylene glycol
a mixture of the monophenyl ethers of ethylene glycol and diethylene glycol Mixtures of these and equivalent members of this class of cosolvents are included also as suitable. Preferred aryl glycol ethers correspond to the above formula wherein R is hydrogen and Ar is benzene, as may be exemplified by $\beta$-phenoxyethanol. The aryl glycol ether component of the organic solvent mixture need not necessarily be volatilized at the fixation temperature of the solvent dyeing process, above referred to and, in addition, does not necessarily function to "swell" the fiber. The latter two attributes although preferable are not requirements, it being essential in the instance of the cosolvent that it serve to improve the solubility of the dyestuff in the organic liquid. Moreover in addition to its cosolvent effect, the cosolvent may function to "swell" the textile fiber, thicken the dye formulation "wet out" the fiber, or otherwise assist in the dyeing operation. The subject aryl glycol ethers tend to increase the viscosity of the dyestuff of the organic dyestuff composition, thereby exhibiting an additional benefit of reducing dye migration tendencies. In many instances, the cosolvent aryl glycol ethers will have a boiling point somewhat above the temperature obtained in the vapor exposure unit, as encountered, for example, in the aforedescribed solvent dyeing procedure; in such instances, the cosolvent may be removed in a subsequent soaping or scouring step as is conventionally employed in dyeing process operations.

The aryl glycol ethers employed as component in the organic solvent mixtures of the dyestuff compositions of the present invention have been found to be excellent solubilizing agents for many organic dyestuffs and this property enables preparation of concentrated dye solutions which can be utilized by the dyer by simple dilution thereof with an organic solvent, thereby obviating the often arduous step of dissolving the organic dyestuff in the solvent or mixture of solvents prior to formulation of the dye bath. Accordingly, one aspect of the present invention provides concentrated organic solvent solutions of the organic dyestuffs which serve as stock solutions. Such solutions are capable of being prepared by the manufacturer of the organic dyestuffs and shipped to the dyer who, by simple dilution of the stock solution with a suitable organic compound solvent, may reduce the dyestuff concentration to the desired value, as set forth in the claims of the present application. Accordingly, in its broadest concept, the present invention includes dyestuff compositions comprising as organic solvent mixture, a liquid organic compound, and cosolvent in almost any proportion, for example, from 1 to 99 to 99 to 1 parts by weight of the organic solvent mixture. THe organic dyestuff is employed in concentrations from about 1.0 to about 50 parts, by weight, and preferably from about 5 to about 25 parts, by weight, per 100 parts of dyestuff composition, in such stock solutions.

The dyestuff compositions which have been found to be useful as starting materials in solvent dyeing procedures, as above described, generally contain from about 0.001 to about 30 parts, by weight, of an organic dyestuff as above defined, about 99.999 to about 70 parts, by weight, of organic solvent mixture comprising from about 10 to 99 parts of the liquid organic compound solvent and from about 90 to about 1 parts of the aryl glycol ether cosolvent. Preferably, however, the dyestuff compositions of this invention comprise essentially from about 0.1 to 25 parts, by weight, of an organic dyestuff, based on the total weight of the composition, dissolved or dispersed in about 99.9 to 75 parts, based on the total weight of the composition, of said organic solvent mixture comprising from about 90 to 50 parts, by weight, based on the weight of the solvent mixture, of said liquid organic compound and from about 10 to about 50 parts, by weight, based on the weight of the solvent mixture, of said aryl glycol ether.

The concentrated organic solvent dyestuffs of the present invention preferably are prepared so as to contain substantial amounts of the cosolvents i.e. aryl glycol ethers, which tend to solubilize the organic dyestuffs and confer shelf stability upon the same. As indicated above, these concentrated solutions are convenient forms of the organic dyestuffs to be used in the solvent dyeing process requiring only dilution by the dyer prior to application of the dyestuff composition to the textile material to be dyed. The formulation of the eventual dye bath can be modified, as desired, by addition of adjuvants which assist the application of the dyes to various materials.

In certain instances, depending upon the nature of the fiber to be treated, it is advantageous to employ fiber swelling or infusing agents to aid in the introduction and absorption of the organic dyestuff into the fiber. In dyeing synthetic fibers, organic swelling agents are generally employed. Illustrative organic fiber-swelling agents are the alkylene carbonates, such as ethylene carbonate and/or dialkylene acylamides, such as dimethylformamide and diethylformamide. The organic fiber swelling or infusing agent is employed in amounts up to 0.1 part on the weight of the fiber (OWF) equivalent up to 10 parts by weight of agent per 100 parts by weight of dye formulation. Preferably, the organic swelling agent is employed in amounts of 0.01 to about 0.05 OWF (equivalent to about 0.1 to 5 parts per 100 parts by weight of dye liquor). In dyeing natural fibers, the dyestuff compositions of the present invention may also include water as a swelling agent in substantial amount, generally, at best about 5 parts by weight, per 100 parts of dyestuff composition and preferably, between about 8 and 12 parts by weight, per 100 parts of dyestuff composition.

As is well known in the dyeing art, surfactants, e.g. emulsifying agents, dispersing agents, wetting agents and the like, may and generally are used to assist in the dyeing operation, particularly, in the dyeing of natural fibers, the dyestuff composition of the present invention may contain substantial amounts of water; the presence of water and organic solvent results in an incompatible mixture which can be emulsified or dispersed by use of such surfactants. It is to be understood that other agents well known to those skilled in the dyeing and textile treatment arts can be added to the dyestuff composition to achieve the desired recognized advantages and properties such as leveling, penetrating, antimigrating and the like effects, in the finished textile substance without departing from the spirit of the present invention.

Typical formulations for such materials are indicated by the following examples:

For nylon:
| | |
|---|---|
| Dyestuff | 0.5 parts |
| perchloroethylene | 90.0 parts |
| β-phenoxyethanol | 10.0 parts |

For acrylic and polyvinyl chloride:
| | |
|---|---|
| Dyestuff | 1.0 parts |
| 1,1,1-trichloroethane | 97.0 parts |
| β-phenoxyethanol | 2.0 parts |
| ethylene carbonate | 0.8 part |
| Armid O (oleylamide as disclosed in line 30, column 2 of U.S. Pat. No. 3,373,174) | 0.2 part |

For cotton, rayon and wool:
| | |
|---|---|
| Dyestuff | 2.0 parts |
| perchloroethylene | 40 parts |
| β-phenoxyethanol | 45 parts |
| surfactant | 5 parts |
| water | 10 parts |

The dyeing of mixed fibers, e.g. polyester/cotton blends, can be readily accomplished by the novel compositions of the present invention also. The padding solution or dispersion can be prepared from a mixture of direct dye (for the cotton fibers) and a polyester dye. By proceeding as for the dyeing of each of the fibers alone, solid shades or cross-dyeing effects can be readily obtained in what amounts to a one-bath procedure.

Acrylics also can be readily dyed in accordance with the invention. The continuous dyeing methods presently used for the coloration of this fiber are, so far as I am aware, confined to the dyeing of raw stock or tow. Moreover, said methods require from ten to thirty minutes for the fixation of the dyestuff. In contrast to these methods, the compositions of the present invention when used in the solvent dyeing procedure, permit dyeings of acrylic polymers, modacrylics or acrylic copolymers in piece goods or fabric form in thirty to sixty seconds with relative ease.

It is well known that in the application of cationic dyestuffs to acrylics, there is a critical temperature at which the "strike" or adsorption of the dye by the fiber is extremely rapid. For this reason, to obtain level dyeings on piece goods by the conventional dyeing processes, it is necessary to add retarding agents to the dye bath. Such agents have affinity for the fiber and are slowly replaced by the dyestuff or have affinity for the dye forming an addition complex which is slowly broken down or otherwise released at a controlled rate. It is a surprising feature of the present invention at acrylics can be dyed in level shades in the absence of such additives or retardants. THe following examples illustrate the present invention. Parts and percentages are by weight and temperatures are given in degrees Centigrade, unless otherwise indicated. "C.I." refers to the Second Edition of the Color Index, published by The American Association of Textile Chemists and Colorists.

EXAMPLE 1

A dyestuff solution was prepared by dissolving 5 parts of Nabor Orange R base (C.I. Basic Orange 22 C.I. 48040) in a mixture of 250 parts (by volume) of β-phenoxyethanol, 50 parts (by volume) of ethylene carbonate and 695 parts (by volume) of ethylene glycol monomethyl ether.

This solution was padded on an acrylic textile fabric and the padded fabric was passed trough squeeze rollers to express pad liquor in excess of about 100 percent of the weight of the fabric. The fabric was exposed to vapors of perchloroethylene for 35 seconds and then scoured in a 0.25 percent aqueous nonionic detergent solution at 85° for five minutes. The washed fabric was oven dried at 85°. The fabric was dyed a deep orange shade which possessed excellent fastness to drycleaning, crocking, washing and to light.

EXAMPLE 2

A dye solution prepared by dissolving 5.0 parts of a disperse dye corresponding to the formula

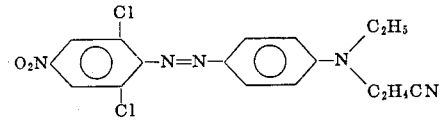

In a mixture consisting of 250 parts (by volume) of β-phenoxyethanol and 745 parts (by volume) of trichloroethylene was used to pad a polyester fabric. The padded textile was passed through squeeze rollers expressing dyestuff liquor in excess of about 100 percent of the weight of the polyester fabric. The textile was exposed posed for about 35 seconds to vapors of perchloroethylene and then scoured in a 0.25 percent aqueous nonionic detergent solution for 5 minutes at 85°. The washed material was dried. The textile material was dyed a heavy shade of burnt orange which was of good fastness to drycleaning solvents, washing, crocking and to light.

EXAMPLE 3

A dyestuff composition consisting of 0.5 part of an acid dye corresponding to the formula

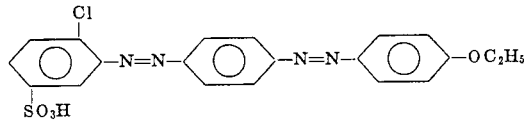

in 15 parts (by volume) of β-phenoxyethanol and 35 parts (by volume) of trichloroethylene was padded at room temperature on a polycaproamide textile fabric. The padded textile was passed through squeeze rollers to remove padding liquor in excess of 100 percent of the weight of the the textile. The fabric was then exposed to vapors of perchloroethylene for 20 seconds and then placed in a conventional Scorch Tester (as described in AASTCC–1965 Manual, page B–108) at 130° for 40 seconds to evaporate the solvents—McCutcheon's "Detergents and Emulsifiers 1969 Annual," page 102. The dyed material was scoured in a hot (85°) 0.25 percent aqueous Nacconol SL (a 35 percent liquid alkyl aryl sulfonate-sodium salt wetting agent as disclosed in McCutcheon's "Detergents and Emulsifiers 1963 Annual," page 98, line 1) solution for five minutes and then dried. The polyamide textile material was dyed a heavy reddish yellow shade characterized by excellent penetration and levelness. The dyeing was of excellent fastness to washing, crocking and to drycleaning solvents.

EXAMPLE 4

A dyestuff composition was prepared by dissolving 0.5 part of C.I. Direct Blue 55 (C.I. 27940) in a mixture of 0.5 part (by volume) of polyoxyethylene oleyl methyl ammonium chloride (Ethoquad 0/12 a 95 percent liquid cationic emulsifier derived from oleic acid as disclosed in McCutcheon's "Detergents and Emulsifiers 1969 Annual" page 102 ), 7.5 parts (by volume) of β-phenoxyethanol and 42 parts (by volume) of trichloroethylene. This composition was padded on cotton cloth which was then passed through squeeze rollers to remove padding liquor in excess of about 100 percent of the weight of the cloth. This cloth was exposed to perchloroethylene vapors for 25 seconds and then heated in a scorch tester at 130° for 35 seconds. The dyed material was scoured in a hot (90°) detergent solution containing 0.25 percent each of a nonionic detergent and sodium carbonate for five minutes. The dyed cloth was rinsed in cold water and dried. This cotton cloth was dyed a dark blue shade characterized by excellent penetration and fastness to washing, light and drycleaning solvents.

EXAMPLE 5

This example illustrates the dyeing of a polyester-cotton union fabric.

A cotton dyestuff composition was prepared by disolving 0.5 parts of C.I. Direct Red 31 and 2.0 parts (by volume) of Ethoquad 0/12 (the aforementioned 95 percent liquid cationic emulsifier disclosed in McCutcheon's "Detergents and Emulsifiers 1969 Annual" page 102) 15 parts (by volume) of β-phenoxyethanol and 83 parts (by volume) of trichloroethylene.

Similarly, a polyester dyestuff composition was prepared by dissolving 0.5 part of a disperse dye corresponding to the formula

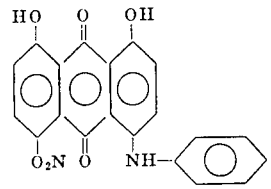

in 5.0 parts (by volume) of β-phenoxyethanol and 45 parts (by volume) of trichloroethylene.

A length of polyester-cotton checkered fabric was padded in a bath composed of equal parts (by volume) of the two dyestuff compositions prepared above at 10 p.s.i.g. The padded cloth was passed through squeeze rollers to express liquor in excess of 100 percent of the weight of the cloth. The padded material was exposed to vapors of perchloroethylene for 25 seconds and then heated in a Scorch Tester at 130°. The dyed fabric was soaped in a hot (90°) detergent solution containing 0.25 percent each on a nonionic detergent and sodium carbonate. After being rinsed in cold water, the dyed cloth was dried.

The checkered cloth was dyed a deep red shade in the cotton squares and a deep blue shade in the polyester squares. The dyeing was characterized by excellent penetration and fastness of the dyeings of washing, light, crocking and drycleaning solvents was excellent.

EXAMPLES 6–12

The continuous dyeing of textile materials is illustrated by the following examples.

The dyeing process was conducted by passing a textile through a padding device, by which means the dyestuff composition of the present invention was introduced, onto and into the textile fabric. The so-wetted textile fabric was passed through squeeze rollers to remove liquor in excess of 100 percent of the weight of the fabric and into a zone filled with vapors of the solvent employed until fixation of the dyestuff had taken place. The exposed fabric was then directed over heated cans or rolls whereby the solvents remaining on the dyed fabric were "flashed off." The dried fabric was then scored in conventional manner to remove any remaining solvent. The nature of the textile fabric, dyestuff composition, time periods, etc., are set out in table I below. The apparatus employed in effecting the dyeing process of these examples is described in the drawing and in particular in Canadian Pat. No. 805,370, entitled "Method and Apparatus for Treating Fabric and the Like," of K. R. Surprenant, issued Feb. 4, 1969, the disclosure of which is incorporated herein by reference.

TABLE I

| Example | Type of fiber | Dyestuff Kind | Amount OWF (¹) | Dye-stuff | Solvent | Co-solvent and/or dyeing assistant | Temp., °C. | Time, sec. |
|---|---|---|---|---|---|---|---|---|
| 6 | Nylon | C.I. Acid Red #182 | 0.2 | 0.2 | 90 perchloroethylene | ² 10 | 130 | 60 |
| 7 | Polyester | C.I. Disperse Blue 27 (C.I. 60767). | 0.5 | 0.5 | 89.5 perchloroethylene | ² 5.0 <br> ³ 5.0 | 121 | 45 |
| 8 | do | do | 0.5 | 0.5 | 50.0 trichloroethylene | ² 49.5 | 87 | 45 |
| 9 | Acrylic | do | 0.5 | 0.5 | 69.5 trichloroethylene | ² 25.0 <br> ⁴ 5.0 | 121 | 35 |
| 10 | Polyester | do | 0.5 | 0.5 | 89.5 perchloroethylene | ² 0.5 <br> ³ 9.5 | 121 | 45 |
| 11 | do | Dispersed Violet #42 | 0.8 | 0.8 | 89.2 trichloroethylene | ² 10.0 <br> ⁵ 0.4 <br> ⁶ 0.4 | 143 | 60 |
| 12 | Acrylic | Basic Yellow 13 | 0.4 | 0.4 | 85.0 trichloroethylene | ² 10 <br> ⁴ 5 | 121 | 60 |

¹ OWF—Dye based on weight of fabric.
² Parts ethylene glycol phenyl ether.
³ Dimethyl formamide.
⁴ Ethylene carbonate.
⁵ Alkylphenoxypolyethyleneoxyethanol (Igepal DM 530, a 100% nonionic liquid emulsifiers disclosed in McCutcheon's "Detergents and Emulsifiers 1969 Annual," page 123).
⁶ Ethofat C 15—Coco acid esters of Polyoxyethylene glycol, a 100% liquid nonionic emulsifier as disclosed in McCutcheon's "Detergents and Emulsifiers 1969 Annual," page 101.

(1) Owf-dye based on weight of fabric.
(2) parts ethylene glycol phenyl ether.
(3) Dimethyl formamide.
(4) Ethylene Carbonate.
(5) Alkylphenoxypolyethyleneoxyethanol (Igepal DM 530) a 100 percent nonionic liquid emulsifier disclosed in McCutcheon's "Detergents and Emulsifiers 1969 Annual" page 123).
(6) Ethofat C 15—coco acid esters of Polyoxyethylene glycol, a 100 percent liquid nonionic emulsifier as disclosed in McCutcheon's "Detergents and Emulsifiers 1969 Annual" page 101.

EXAMPLE 13

Part A—Preparation of Dioctylamine Salt of Dyestuff

A slurry of 54.5 parts of a dye having the formula

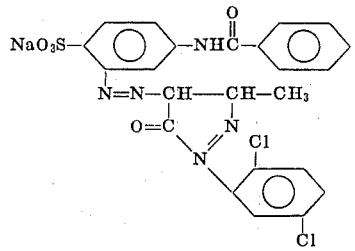

and 500 parts of water was heated to 90° to the pH of the resulting solution was adjusted to 3.6 by the addition of about 125 parts (by volume) of glacial acetic acid. To this mass, was added 24.1 parts of dioctylamine, while maintaining the pH constant by the addition of glacial acetic acid. The resultant slurry was agitated for about one-half hour. Thereafter, the aqueous liquor was decanted from the tarry dyestuff amine salt and the latter dried at 30° to 40° in a vacuum oven.

Part B—Preparation of Concentrated Dyestuff Solution

A mixture of 30 parts of the dioctylamine salt prepared in part A above, 30 parts of β-phenoxyethanol and 30 parts of 1,1,1-trichloroethane was heated at 60° to 70° for one-fourth hour. The resultant solution was filtered to remove a slight amount of sediment. The clarified solution was stable on storage, i.e. the solution did not deposit any insoluble material on standing for 24 hours or longer at ambient temperature. On dilution of the concentrated solution with trichloroethane (1 part of dye solution in 1,000 parts of trichloroethane) substantially no insoluble material was noted.

Part C—Continuous Solvent Dyeing with Dyestuff Solution

A dye bath was prepared by diluting 8 parts of the concentrated dyestuff solution prepared in part B above to 1,000 parts (by volume) with trichloroethane. This solution was used as padding liquor to dye nylon cloth as described in example 6 above. Excellent yellow dyeings were obtained. The dyestuff penetrated well into the nylon. Fastness of the dyeing to crocking and drycleaning solvents was good and the fastness to washing was fair.

The dyeings of the synthetic fiber containing textile fabrics by this solvent dyeing procedure were characterized by the excellent penetration of the dyestuff into the individual filaments comprising the yarns making up the fabrics, it being noted that the dyestuff penetrated well into those difficulty accessible areas where twists and crossovers occur. Such penetration of dye yielded dyeings of excellent levelness and uniformity. The fastness properties of the resultant dyeings were excellent and compared very well with analogous dyeings made by the conventional aqueous dye bath procedures.

I claim:

1. A dyestuff composition comprising an organic dyestuff dissolved or dispersed in an organic solvent mixture comprising predominantly:
    1. a volatile stable liquid halogenated short-chain aliphatic hydrocarbon boiling below about 160° C.,
    2. an aryl glycol ether corresponding to the general formula

$$Ar(OCH_2CHR_n\text{---}OH$$

wherein R is a member of the group consisting of hydrogen and methyl, n is an integer of from 1 to 2 and Ar is an aromatic hydrocarbon radical selected from the group consisting of phenyl, halophenyl and alkylphenyl wherein the alkyl group is a short-chain alkyl group, and
    3. water in the amount of from 0 to about 12 parts by weight per 100 parts of the dyestuff composition.

2. The composition of claim 1 wherein said liquid organic compound is at least one halogenated hydrocarbon containing from 1 to 4 carbon atoms, from 2 to 4 halogen atoms thereof having an atomic number from about 9 to 35.

3. The composition of claim 1 wherein said aryl glycol ether corresponds to the general formula

$$Ar(OCH_2CHR)_n\text{---}OH$$

wherein R is hydrogen and AR is phenyl.

4. The dyestuff composition of claim 1 wherein said aryl glycol ether is present in an amount of from about 1 to 99 parts, by weight, of the organic solvent mixture.

5. THe dyestuff composition of claim 1, which is particularly adapted for the dyeing of a synthetic fiber, which additionally contains an organic swelling agent in minor amount.

6. The dyestuff composition of claim 1 comprising essentially from about 0.1 to 25 parts, by weight, of an organic dyestuff, based on the total weight of the composition, dissolved or dispersed in about 99.9 to 75 parts, based on the total weight of the composition, of said organic solvent mixture comprising from about 90 to 50 parts, by weight, based on the weight of the solvent mixture, of said liquid organic compound and from about 10 to about 50 parts, by weight, based on the weight of the solvent mixture, of said aryl glycol ether.

7. The dyestuff composition of claim 1 wherein said organic dyestuff is in a solvent-soluble state.

8. The dyestuff composition of claim 7 wherein said organic dyestuff is a solvent dye.

9. The dyestuff composition of claim 8 wherein said solvent dye is an organic salt formed by reaction of an acid or direct dye containing at least one sulfonic acid group or alkali metal salt thereof with dioctylamine.

12. The dyestuff composition of claim 1 wherein said organic dyestuff is a dispersed dye.

11. The dyestuff composition of claim 1 wherein said organic dyestuff is an acid dye.

12. The dyestuff composition of claim 1 wherein said organic dyestuff is a direct dye.

13. THe dyestuff composition of claim 1 wherein said organic dyestuff is a basic dye.

14. The dyestuff composition of claim 6 wherein said organic dyestuff is in a solvent-soluble state, said liquid organic compound is at least one halogenated hydrocarbon containing from 1 to 4 carbon atoms, from 2 to 4 halogen atoms thereof having an atomic number from about 9 to 35, and said aryl glycol ether corresponds to the formula $$AR(OCH_2CHR)_n—OH$$

wherein R is hydrogen and Ar is benzene.

15. The dyestuff composition of claim 14 wherein said organic dyestuff is an organic salt formed by reaction of an acid or direct dye containing at least one sulfonic acid group or alkali metal salt thereof with an organic base and wherein said aryl glycol ether is $\beta$-phenoxyethanol.

16. The dyestuff composition of claim 15 wherein said halogenated hydrocarbon is perchloroethylene.

17. The dyestuff composition of claim 15 wherein said halogenated hydrocarbon is trichloroethylene.

18. The dyestuff composition of claim 15 wherein said halogenated hydrocarbon is 1,1,1-trichloroethane.

19. The dyestuff composition of claim 15 wherein said halogenated hydrocarbon is methylene chloride.

20. A dyestuff composition as defined in claim 6 which is particularly adapted for dyeing of polyamide materials comprising: (1) about 0.5 part of an organic dyestuff, (2) about 90 parts of a liquid organic compound selected from the group consisting of perchloroethylene and 1,1,1-trichloroethane and (3) about 10 parts of $\beta$-phenoxyethanol.

21. A dyestuff composition as defined in claim 6 which is particularly adapted for dyeing of acrylic or polyvinyl chloride materials comprising: (1) about 1.0 part of an organic dyestuff, (2) about 97 parts of a liquid organic compound selected from the group consisting of perchloroethylene and 1,1,1-trichloroethane, (3) about 2.0 parts of $\beta$-phenoxyethanol, (4) about 0.8 part of an organic swelling agent and (5) about 0.2 part of a surfactant.

22. A dyestuff composition as defined in claim 6 which is particularly adapted for dyeing cotton, rayon or wool materials comprising: (1) about 2.0 parts of an organic dyestuff, (2) about 40 parts of a liquid organic compound selected from the group consisting of perchloroethylene and 1,1,1-trichloroethane, (3) about 45 parts of $\beta$-phenoxyethanol, (4) about 10 parts of water as swelling agent and (5) about 5 parts of a surfactant.

PO-1050
(5/69)

UNITED STATES PATENT OFFICE
CERTIFICATE OF CORRECTION

Patent No. 3,617,211                    Dated   November 2, 1971

Inventor(s)  Ross R. Dawson

It is certified that error appears in the above-identified patent and that said Letters Patent are hereby corrected as shown below:

Column 1, line 8, "THe" should be --The--.

Column 1, line 43, "THe" should be --The--.

Column 1, line 54, "THe" should be --The--.

Column 1, line 58, "THe" should be --The--.

Column 2, line 3, "DIsperse" should be --Disperse--.

Column 2, line 19, "DIrect" should be --Direct--.

Column 2, line 36, delete the "(" before the words C.I. Acid Blue 113(C.I. 26360)

Column 2, line 71, before the word "amine" insert --an--.

Column 2, line 72, "Solutions" should be --solutions--.

Column 3, line 3, after the word "convenient" insert --amount--.

Column 3, line 13, before the word "oil" insert --the--.

Column 3, line 14, "THe" should be --The--.

Column 3, line 29, "THe" should be --The--.

Column 3, line 47, "sable" should be --stable--.

Column 4, line 14, delete the second "is".

Column 4, line 22, "THe" should be --The--.

PO-1050
(5/69)

UNITED STATES PATENT OFFICE
CERTIFICATE OF CORRECTION

Patent No. 3,617,211　　　　　　　　　Dated November 2, 1971

Inventor(s) Ross R. Dawson　　　　　　　PAGE - 2

It is certified that error appears in the above-identified patent and that said Letters Patent are hereby corrected as shown below:

Column 4, line 32, the word "Example" should be --Examples--.

Column 5, line 22, "THe" should be --The--.

Column 6, line 64, "at" should be --that--.

Colunn 6, line 65, "THe" should be --The--.

Column 7, line 5, "trough" should be --through--.

Column 7, line 29, delete the word "posed".

Column 7, line 50, "delete the third "the".

Column 7, line 53, delete the "S" in AASTCC-1965

Column 9, in footnote #5, the word "monionic" should be --nonionic--.

Column 9, in footnote #6, the word "monionic" should be --nonionic--.

Column 9, please delete the second set of footnotes appearing at lines 23 through 35.

Column 9, line 53, after "90°" delete "to" and insert --and--.

Column 10, claim 1, in the formula, please insert a parenthesis after "CHR". Formula should read $Ar(OCH_2CHR)_n\text{-}OH$ Column 10, claim 5, first line, "THe" should be --The--.

Column 11, claim 12 (the first claim 12 appearing in Column 11) should be --10--.

PO-1050
(5/69)

UNITED STATES PATENT OFFICE
CERTIFICATE OF CORRECTION

Patent No. 3,617,211              Dated November 2, 1971

Inventor(s) Ross R. Dawson              PAGE - 3

It is certified that error appears in the above-identified patent and that said Letters Patent are hereby corrected as shown below:

Column 11, claim 13, first line "THe" should be --The--.

Signed and sealed this 27th day of June 1972.

(SEAL)
Attest:

EDWARD M. FLETCHER, JR.                ROBERT GOTTSCHALK
Attesting Officer                      Commissioner of Patents